(12) United States Patent
Forslund et al.

(10) Patent No.: US 10,816,966 B2
(45) Date of Patent: *Oct. 27, 2020

(54) PARKING POSITION

(71) Applicant: KONGSBERG MARITIME SWEDEN AB, Kristinehamn (SE)

(72) Inventors: Michael Forslund, Kristinehamn (SE); Jonas Johansson, Hammaro (SE)

(73) Assignee: Kongsberg Maritime Sweden AB, Kristinehamn (SE)

( * ) Notice: Subject to any disclaimer, the term of this patent is extended or adjusted under 35 U.S.C. 154(b) by 8 days.

This patent is subject to a terminal disclaimer.

(21) Appl. No.: 16/177,984

(22) Filed: Nov. 1, 2018

(65) Prior Publication Data

US 2019/0072948 A1 Mar. 7, 2019

Related U.S. Application Data

(63) Continuation of application No. 15/315,971, filed as application No. PCT/EP2015/062453 on Jun. 3, 2015, now Pat. No. 10,133,269.

(Continued)

(30) Foreign Application Priority Data

Jul. 2, 2014 (SE) .................................. 1450820
Jul. 2, 2014 (SE) .................................. 1450821

(51) Int. Cl.
*B63H 11/11* (2006.01)
*B63H 11/02* (2006.01)
(Continued)

(52) U.S. Cl.
CPC ............ *G05D 1/0011* (2013.01); *B63B 59/08* (2013.01); *B63G 8/001* (2013.01); *B63G 8/08* (2013.01);
(Continued)

(58) Field of Classification Search
CPC .... G05D 1/0011; G05D 1/0206; B63B 59/08; B63B 2755/00; B63B 2751/00;
(Continued)

(56) References Cited

U.S. PATENT DOCUMENTS 3,420,204 A 1/1969 Samuel
3,581,702 A 6/1971 Moberg
(Continued)

OTHER PUBLICATIONS

Quicksilver Commander 3000 Series Remote Controls Installation and Operation Instructions (90-824480 1193), finalized Jul. 18, 2018, 3 pages.

(Continued)

*Primary Examiner* — Anthony D Wiest
(74) *Attorney, Agent, or Firm* — Foley & Lardner LLP

(57) ABSTRACT

Various aspects provide for "parking" an apparatus in a "parking position." A parking position may be a configuration of an apparatus that minimizes damage resulting from extended exposure during periods of inactivity. An apparatus may comprise a marine apparatus, which may be configured to be disposed in an environment comprising saltwater, salty air, brackish water, freshwater, and the like. An apparatus may comprise a propulsion system (e.g., for a ship) and/or a steering system. Some aspects include a water jet based propulsion system having a scoop and a nozzle operable to redirect the water jet, providing a range of forward/backward and port/starboard thrusts. A control cylinder and/or a linkage may be parked in a configuration that segregates damage incurred during periods of inactivity to portions of an apparatus not needed for normal operation.

13 Claims, 15 Drawing Sheets

Related U.S. Application Data

(60) Provisional application No. 62/007,424, filed on Jun. 4, 2014.

(51) Int. Cl.

| | | |
|---|---|---|
| *G05D 1/00* | (2006.01) | |
| *G05D 1/02* | (2020.01) | |
| *B63H 25/26* | (2006.01) | |
| *G05G 5/05* | (2006.01) | |
| *B63G 8/00* | (2006.01) | |
| *B63G 8/08* | (2006.01) | |
| *B63H 21/17* | (2006.01) | |
| *F15B 11/12* | (2006.01) | |
| *F15B 20/00* | (2006.01) | |
| *F15B 21/02* | (2006.01) | |
| *B63B 59/08* | (2006.01) | |

(52) U.S. Cl.
CPC .............. *B63H 11/02* (2013.01); *B63H 11/11* (2013.01); *B63H 21/17* (2013.01); *B63H 25/26* (2013.01); *F15B 11/12* (2013.01); *F15B 20/00* (2013.01); *F15B 21/02* (2013.01); *G05D 1/0206* (2013.01); *G05G 5/05* (2013.01); *B63G 2008/005* (2013.01); *F15B 2211/85* (2013.01)

(58) Field of Classification Search
CPC .......... F15B 21/02; F15B 20/00; F15B 11/12; F15B 2211/85; F15B 2211/7054; F15B 2211/865; F15B 15/1461; F15B 11/121; B63H 21/17; B63H 11/02; B63H 25/26; B63H 11/11; B63H 25/48; B63H 11/01; B63H 25/22; B63H 11/107; B63G 8/08; B63G 8/001; B63G 2008/005; G05G 5/05
See application file for complete search history.

(56) References Cited

U.S. PATENT DOCUMENTS

| | | | |
|---|---|---|---|
| 4,015,556 A | 4/1977 | Bordiga | |
| 4,310,320 A | 1/1982 | Pitchford | |
| 5,224,887 A * | 7/1993 | Futaki | B63H 11/10 |
| | | | 440/46 |
| 5,246,392 A | 9/1993 | Johnston | |
| 5,720,635 A | 2/1998 | Roos | |
| 5,892,338 A | 4/1999 | Moore et al. | |
| 6,045,418 A * | 4/2000 | Roos | B63H 11/01 |
| | | | 440/38 |
| 6,174,210 B1 | 1/2001 | Spade et al. | |
| 6,584,884 B1 * | 7/2003 | Duell | B65F 3/046 |
| | | | 91/459 |
| 7,080,589 B2 | 7/2006 | Beule | |
| 7,222,577 B2 | 5/2007 | Morvillo | |
| 8,291,810 B2 | 10/2012 | Hey et al. | |
| 10,133,269 B2 | 11/2018 | Forslund et al. | |
| 2001/0029134 A1 * | 10/2001 | Moffet | B63H 25/46 |
| | | | 440/41 |
| 2002/0017089 A1 | 2/2002 | Faivre | |
| 2008/0189001 A1 * | 8/2008 | Morvillo | B63H 11/117 |
| | | | 701/21 |
| 2011/0159752 A1 | 6/2011 | Ota et al. | |
| 2012/0073961 A1 | 3/2012 | Kagawa | |
| 2012/0197467 A1 * | 8/2012 | Morvillo | B63H 11/11 |
| | | | 701/21 |
| 2013/0218376 A1 * | 8/2013 | Morvillo | B63H 11/107 |
| | | | 701/21 |
| 2014/0028240 A1 | 1/2014 | Heumann et al. | |
| 2014/0365050 A1 * | 12/2014 | Morvillo | B63H 25/02 |
| | | | 701/21 |
| 2017/0121000 A1 | 5/2017 | Forslund et al. | |

OTHER PUBLICATIONS

Swedish Office Action issued in Patent Application No. 1450820-4 dated Apr. 21, 2015, 8 pages.
Swedish Office Action issued in Patent Application No. 1450820-4 dated Oct. 16, 2015, 6 pages.
Response to International Search Report and Written Opinion filed in European Patent Application No. 15726964.8 dated Dec. 29, 2016, 4 pages.
International Search Report issued in International Patent Application No. PCT/EP2015/062453 dated Sep. 10, 2015, 3 pages.
Written Opinion of the International Searching Authority issued in International Patent Application No. PCT/EP2015/062453 dated Sep. 10, 2015, 8 pages.

* cited by examiner

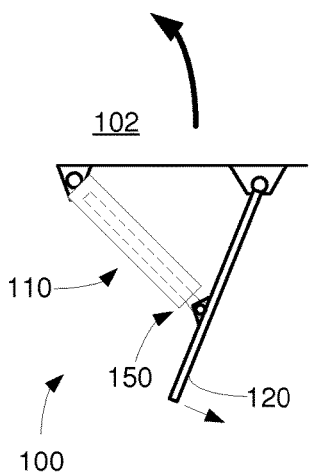
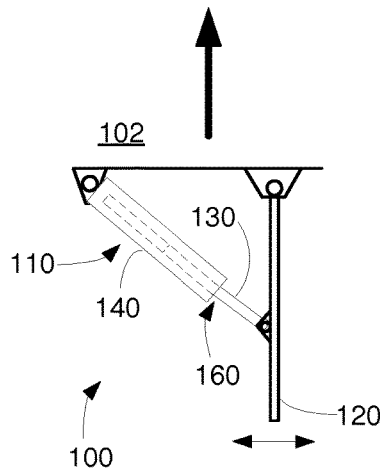
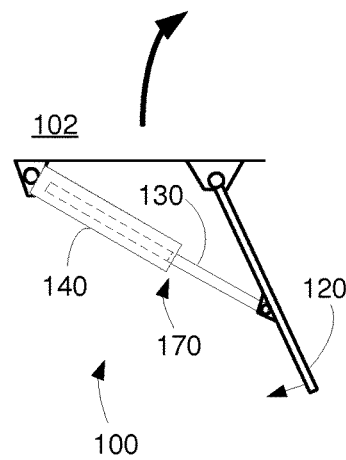
FIG. 1A  FIG. 1B  FIG. 1C
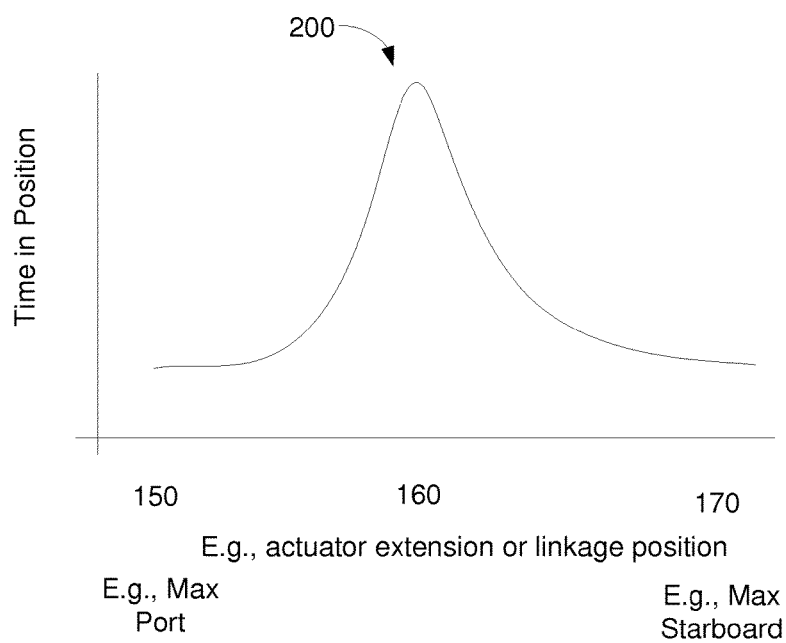
FIG. 2

# PARKING POSITION

CROSS-REFERENCE TO RELATED APPLICATIONS

This application is a continuation of U.S. patent application Ser. No. 15/315,971, entitled "PARKING POSITION," filed Dec. 2, 2016, which is a National Stage of PCT/EP2015/062453, filed Jun. 3, 2015, entitled "PARKING POSITION," which claims priority to Swedish Patent Application No. 1450820-4, filed Jul. 2, 2014, and claims priority to Swedish Patent Application No. 1450821-2, filed Jul. 2, 2014, and claims priority to U.S. Provisional Patent Application Ser. No. 62/007,424, filed Jun. 4, 2014, all of which are incorporated by reference in their entirety.

TECHNICAL FIELD

The present invention relates generally to reducing degradation of surfaces, and more particularly to wear associated with localized damage of contact areas.

BACKGROUND

Many surfaces are damaged by processes such as corrosion, deposition, film formation, growth of organisms, dissolution of passivating layers, and the like (hereinafter: damage processes). In some cases, damage may be caused by the process per se. In some cases, a product of the process (e.g., a particles of metal, oxide, a hydroxide, or salt) may cause damage (e.g., if the product of the process abrades or contaminates parts of the system). Some degradation processes (e.g., galvanic and/or crevice corrosion) may be localized, and may be associated with a contact area between different components. When damaged, this contact area may perform poorly.

Marine systems may be susceptible to degradation associated with seawater, particularly corrosion and biological processes (e.g., marine growth such as algae, barnacles, coral, and the like). Marine growth may degrade a surface, and products of marine growth may also degrade various components (e.g., abrasion from barnacles).

Mechanical systems often include a variety of components that interact via contact areas between components. An actuator may apply a force and/or displacement on various parts of the system, and may include such contact areas. Often, an actuator is coupled to a linkage, which may transmit force from the actuator to other parts of the system via contact areas. Other components, such as bearings, hinges, sensors, and the like, may include contact areas between components. A process that degrades a contact area between parts may significantly reduce the performance of a system based on those parts.

A hydraulic cylinder may comprise a piston that slides within a barrel. A fluid within the barrel applies pressure to the piston, sliding the piston in and out of the barrel. A hydraulic cylinder has a working length over which it operates, typically defined by a distance between one end of the barrel and an opposing, external end of the piston. An internal end of the piston moves within the barrel to vary length of the cylinder. If length is constrained at the endpoints, the cylinder may apply force between the endpoints, moving an object attached to one end of the cylinder with respect to an object attached to the piston at the other end. A piece of equipment requiring actuation from a hydraulic cylinder typically requires a specified range of motion, and this range of motion is used to determine the necessary working length of the cylinder chosen.

A seal between the barrel and piston of the cylinder allows the piston to slide while ostensibly preventing the passage of material (e.g., hydraulic fluid, dust, water, contaminants) from one side of the seal to the other. Some seals comprise materials that may corrode and/or induce corrosion. With a metallic seal contacting a piston of a dissimilar metal, galvanic corrosion between the seal and the piston may damage the contact area between the seal and the piston (e.g., corroding the seal or corroding the piston). A seal may create a localized chemical environment that, over time, may degrade the surface contacted by the seal.

A variety of apparatus use hydraulic cylinders that are exposed to degrading environments. Marine systems, such as steering systems, may use hydraulic cylinders in a variety of applications, which may include saline environments, extreme temperatures, and immersion in seawater for long times. Corrosion and/or surface growth of organisms may be problematic in marine environments, particularly at contact areas between parts, such as those areas disposed between components that slide past each other (e.g., a seal around a piston in a hydraulic cylinder). The reduction of such damage may improve the performance and/or lifetime of a product being used in a corrosive environment. This improvement may reduce the lifetime costs associated with a system, particularly a large system (e.g., a ship propulsion system) that may be remotely deployed and/or time consuming to repair.

U.S. Pat. No. 5,892,338 describes a radio frequency remote control for trolling motors. U.S. Pat. No. 5,246,392 describes a stern drive system with anti-rotation device. U.S. Pat. No. 5,720,635 describes a marine jet drive.

SUMMARY OF THE INVENTION

Various aspects provide for "parking" an apparatus in a "parking position." A parking position may be a configuration of an apparatus that minimizes environmental damage associated with a surface degradation process (e.g., marine growth, corrosion, wear, and the like) resulting from exposure to an environment during periods of inactivity. A parking position may provide for a configuration that is not needed during operation of the apparatus, and so a parked configuration may be used during inactivity, rather than normal operation. In not being needed for normal operation, the parked configuration may result in damage processes being localized to portions of the apparatus that are infrequently used.

In some embodiments, a propulsion apparatus for a ship comprises a water jet configured to create a jet of water that applies a forward thrust to the ship. A scoop may be shaped to redirect at least a portion of the jet when the scoop is disposed in the jet. The redirected portion may apply a reverse thrust to the ship. The scoop may be positioned to yield a desired combination of forward and reverse thrusts, which may be used to move the ship forward, backward, or generate net zero thrust.

A scoop linkage may couple the scoop to the ship. The scoop and scoop linkage may have a range of motion comprising a forward/reverse working range and an extended scoop position. The forward/reverse working range may span the range of scoop positions required for operation (e.g., propulsion). The extended scoop position may be outside the forward/reverse working range, and may be a position that is not needed for propulsion. An extended scoop position may be "farther forward" than the full forward position and/or "farther reverse" than the full reverse position.

A scoop control cylinder may be coupled to and/or configured to actuate, the scoop and/or the scoop linkage. The scoop control cylinder may comprise a working length through which the scoop control cylinder may be operated to position the scoop within the working range. The scoop control cylinder may include an additional distance, which may position the scoop control linkage (and by extension, the scoop) in an extended scoop position for parking.

Some embodiments include a steering apparatus, which may be used (e.g., on a ship) for navigation. The steering apparatus may be used with a jet of water, and comprise a nozzle through which the jet flows. The nozzle may be operable to redirect the jet in a lateral direction, imposing a lateral thrust on the ship. A nozzle linkage may couple the nozzle to the ship. The nozzle and nozzle linkage may have a lateral range of motion comprising a lateral working range and an extended nozzle position. The lateral working range may span the range of positions within which the nozzle may be positioned during normal operation (e.g., to yield a desired lateral thrust). The extended nozzle position may dispose the nozzle in a position that is outside the lateral working range, to a position that is not needed for normal operation.

The steering apparatus may include a nozzle control cylinder coupled to and configured to actuate the nozzle and/or nozzle linkage. The nozzle control cylinder may comprise a working length and an additional distance. The working length may span a range of positions needed to position the nozzle within the lateral working range (e.g., during steering operations). The additional distance may be operable to position the nozzle linkage (and by extension, the nozzle) in an extended nozzle position for parking.

A propulsion system may comprise a propulsion apparatus and a steering apparatus, each of which may include one or more control cylinders and linkages. In some cases, a propulsion apparatus and a steering apparatus interact with the same jet of water. In some cases, a propulsion apparatus operates with a first jet, and a steering apparatus operates with a second jet. A steering apparatus may include a rudder.

An apparatus may comprise a linkage and an actuator (e.g., a control cylinder, an electrical screw drive, and the like) coupled to the linkage and operable to move the linkage through a range of motion. The linkage may comprise a piston, a lever arm, a pivot, and/or other mechanical components that may be positioned by the actuator. The range of motion may comprise a working range defined by a specification for a piece of equipment (e.g., connected to and/or actuated by the apparatus). The range of motion may include an extended position beyond the working range.

The actuator (e.g., hydraulic cylinder, control cylinder, lead screw) may have a working length operable to position the linkage within the working range. The working length may be the length needed to actuate or otherwise operate the apparatus in order to meet the specifications defined by the equipment. The cylinder may also include an additional distance operable to position the linkage in the extended position. Normal operation of the equipment (other than parking) may not require positioning of the linkage in the extended position and the cylinder at the additional distance. Parking the piece of equipment may comprise positioning the linkage in the extended position by moving the cylinder to the additional distance.

In an exemplary embodiment, an apparatus is configured for use in a marine environment (e.g., on a boat, ship, or submarine or other subsurface device). The apparatus may be mobile and/or stationary. At least a portion of the apparatus (e.g., an actuator) may be disposed in a corrosive environment (e.g., salty air, saltwater, brackish water, produced water, and the like). The apparatus may include a linkage actuated by the actuator (e.g., a lever arm, a piston, and the like). In an embodiment, the apparatus includes at least one of a propulsion and a navigation apparatus (either or both of which may include a water jet). An actuator may include an electrically driven actuator, such as a solenoid, a lead screw, and the like. An actuator may include a hydraulic cylinder.

The present description incorporates by reference U.S. provisional patent application No. 62/007,424, filed Jun. 4, 2014, Swedish patent application no. 1450820-4, filed Jul. 2, 2014, and Swedish patent application no. 1450821-2, filed Jul. 2, 2014.

BRIEF DESCRIPTION OF THE DRAWINGS

FIGS. 1A, 1B, and 1C are graphical representations of a system, according to some embodiments.

FIG. 2 is a diagrammatic representation of time spent in a position as a function of position (in the range of motion), according to some embodiments.

DETAILED DESCRIPTION OF THE INVENTION

Figure 3:
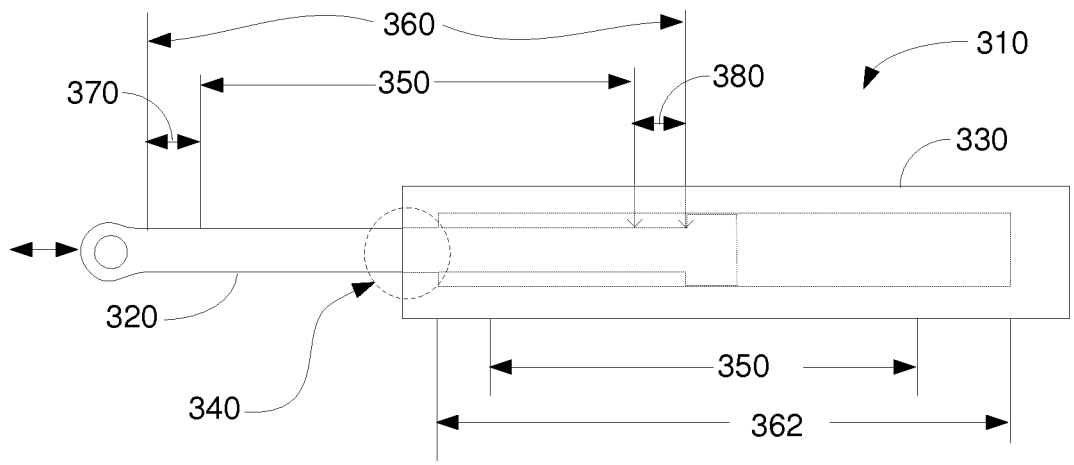
FIG. 3 is a diagrammatic illustration of a cylinder having a working length and an additional distance, according to select embodiments.

Various aspects may reduce damage of various systems, particularly localized damage of contact areas (e.g., wear of parts moving against each other). Damage of a surface may include surface corrosion, crevice corrosion, galvanic corrosion, film deposition, marine growth (e.g., living cells), dissolution of at least a portion of a surface, and the like. Equipment problems may be minimized by restricting the damage to an area that is seldom, or even never, used in normal operation. Damage may be restricted to such an un-needed area by positioning an apparatus in a "parking position."

A parking position for an apparatus may be a configuration in which it is desirable to leave the apparatus during periods of inactivity. In some embodiments, various components (e.g., cylinders, linkage, shapes, sizes, clearances, dimensions, tolerances, and the like) are designed to incorporate an extended or additional range of motion that extends beyond that range of motion needed for normal operation of the apparatus. By "parking" the apparatus in a parking position that is rarely needed (or even not needed) for operation, damage may be restricted to areas that are infrequently needed (e.g., only during parking), minimizing damage incurred during normal operation.

A parking position may be used for reasons other than damage per se (e.g., fatigue, equipment safety, position demarcation, and the like).

Systems and methods described herein may be incorporated into a wide variety of apparatus. For simplicity, select embodiments are described using marine steering examples with hydraulic actuators. Various embodiments include other actuated systems (e.g., robot arms) and actuators (e.g., electrical actuators such as solenoids, ball/screw actuators, and the like). An apparatus may be used in dry environments. An apparatus may be used with produced water and/or other "contaminated" environments.

FIGS. 1A, 1B, and 1C are graphical representations of a system, according to some embodiments. Various embodiments may be directed toward a wide range of applications, such as controlling an aileron on an airplane, a bucket on a wheel loader, a positioning device on a marine apparatus, and the like. For convenience, various embodiments are described in the context of marine control systems, such as may be used for navigation. In exemplary FIGS. 1A, 1B, and 1C, steering system 100 may be connected to a marine apparatus, such as vessel 102 (e.g., a boat, submarine apparatus, a ferry, a dock (e.g., having a movable ramp), a ship, an oil rig, a barge, a bridge (e.g., a drawbridge or otherwise adjustable bridge) and the like). An embodiment may control landing gear on an aircraft. An embodiment may control pitch, yaw, rotation, and/or other navigative characteristics (e.g., controlling a drone aircraft or submarine). An embodiment may control steering of a vehicle (e.g., an automobile, a truck, a tank, and the like). An embodiment may control a lock (e.g., in a canal), a dam, a gate, a valve, and the like. An embodiment may include an electrically driven actuator (e.g., a lead screw, as shown schematically at 1130 in the system of FIG. 11). Cylinder 110 includes a piston 130 and barrel 140 (FIG. 1B). In system 100, one end of cylinder 110 is coupled to ship 102 and the other end (the exterior end of piston 130) is attached to rudder 120. A length between the ends of cylinder 110 is varied by sliding piston 130 within barrel 140. This length and associated force positions rudder 120 in a manner that steers ship 102.

An actuation apparatus (e.g., a steering system) may be designed according to a set of specifications or constraints imposed by the equipment incorporating the apparatus, often in combination with an environment within which the apparatus is used. Typically, these specifications include a range of motion through which the apparatus must operate (e.g., to actuate the equipment through a specified range of positions). The specifications may also include constraints on dimensions that prevent damage to the equipment.

For example, a truck or car may require a desired turning radius, and thus its associated steering wheel, hydraulics, steering linkage, wheels, tires, chassis, and the like will be specified to provide a range of motion that allows the vehicle to turn accordingly.

Typically, the steering requirements of the equipment define the steering requirements of its steering system, which determine the specifications of (inter alia) the actuators (e.g., cylinders) used in the steering system. The actuator is typically chosen to have an operating length that is sufficient to meet the specification of the steering system.

In FIGS. 1A-C, cylinder 110 and rudder 120 may be positioned within a range of motion that results in a desired effect on ship direction, (e.g., per the ship's steering specifications). For example, the desired range of motion may vary to steer ship 102 in directions from port (FIG. 1A) through straight (FIG. 1B) through starboard (FIG. 1C). This range of motion may be controlled by changing the extension length of cylinder 110. In system 100, extension length 150 may be associated with making a sharp turn to port, extension length 160 may be associated with straight-ahead rudder position, and extension length 170 may be associated with a sharp turn to starboard.

Many systems operated by cylinders spend differing amounts of time in different positions. For example, in a steering system, some portion of the range of motion (e.g., that which results in "straight ahead") may be used frequently, as a boat or vehicle often spends significant time moving forward in a straight (or close to straight) direction and/or at a constant heading. Other portions of the range of motion (e.g., a configuration used for a sharp turn) maybe used less frequently (including rarely). An expected use of a hydraulic cylinder (e.g., the typical usage of the equipment actuated by the cylinder) may be used to identify an expected frequency of positions within its operating length during operation.

FIG. 2 is a diagrammatic representation of time spent in a position as a function of position, according to some embodiments. FIG. 2 may illustrate time vs. position for exemplary steering system 100 (FIG. 1), and by extension, time vs. location within cylinder 110's operating length. As shown in exemplary response 200, ship 102 is expected to spend most of its time moving generally "straight ahead" (or straight reverse), with relatively smaller portions of time making sharp turns to port or starboard. As such, cylinder 110 is expected to spend large amounts of time near extension length 160, and relatively less time near extension length 150 or extension length 170.

During use, a given position in a working range or working length may include relatively small oscillatory displacements (e.g., small rudder adjustments to maintain a given heading). For example, a seal (not shown) between piston 130 and barrel 140 may spend a significant amount of time "sealing" the localized region of piston 130 against which it seals when the cylinder is in a "straight ahead" position. For a degradation product that wears the seal, frequent motion may damage the seal, and this damage may be located in a "frequently used" area of the cylinder. Damage associated with small movements around a position may increase with time spent near that position (e.g., response 200 may also represent localized damage to the apparatus as a function of position).

For many applications, a system may be inactive (e.g., stationary) for some time. Some degradation processes (e.g., dissolution of a passivating layer) may occur beneath or around a seal after extended periods of time (e.g., days, weeks, or even months) in a stationary position. Time spent in an inactive position may induce localized damage (e.g., of the piston portion beneath the seal) that is manifest during subsequent periods of activity.

For localized damage associated with inactivity (e.g., at an interface between a seal and a piston when an apparatus is parked), it may be advantageous to park an apparatus in a position not needed for operation (e.g., a portion of the cylinder outside the operating length needed for operation).

Various apparatus (e.g., linkage, cylinder dimensions, clearances, and the like) may be designed in a manner that provides for, in addition to a specified range of motion for operation of a piece of equipment, an "extended" position beyond the required range of motion needed for operation. A parkable apparatus may have an "extended" position (e.g., not needed for the operation within a normal range of motion) and may have interlock that prevents positioning in this extended position during operations other than parking. Parking the apparatus in this extended position during periods of inactivity may localize damage to seldom used (e.g., only for parking) portions of the apparatus, whose performance has minimal effect on normal operation (other than parking) of the apparatus. Such a configuration may be achieved using (for example) a cylinder having an additional distance beyond the working length needed for operation, which may be coupled to a linkage having an extended position beyond the working range needed for operation, such that positioning the cylinder at a point within the additional distance moves the linkage to the extended position.

FIG. 3 is a diagrammatic illustration of a cylinder (e.g., a hydraulic cylinder) having a working length and an additional distance, according to select embodiments. Hydraulic cylinder 310 includes a piston 320 that may be hydraulically driven to slide within a barrel 330. A sealing region 340 may be associated with a seal (not shown) between piston 320 and barrel 330. Cylinder 310 has a working length 350 over which it operates. Working length 350 may be defined by a specification for a working range of an apparatus actuated by cylinder 310 (e.g., a linkage), and encompass the operating length needed for normal operation of the apparatus. Cylinder 310 may incorporate a buffer zone (not annotated) between an end of the barrel and an end of the piston to prevent inadvertent contact between working parts.

Cylinder 310 may be extended or retracted a larger distance 360, a portion of which is outside of working length 350. Larger distance 360 may include one or several positions beyond those needed for normal operation of an apparatus actuated by cylinder 310. Larger distance 360 may include an additional length added to piston 320 and a corresponding increase in depth 362 within barrel 330 through which piston 320 slides. The additional length and additional depth combine to yield an additional distance outside the working length. A desired depth 362 of barrel 330 may be chosen to accommodate a desired combination of working length and additional distance.

For example, cylinder 310 may include an additional distance 370, in which piston 320 withdraws into barrel 330 beyond the working length 350. Cylinder 310 may include an additional distance 380, in which piston 320 extends out from barrel 330 beyond the working length 350. Some embodiments may include one additional distance 370 or 380. Some embodiments may include both additional distances 370 and 380. An additional distance may include a plurality of distances within the additional distance. Parking a cylinder at a position in an additional distance may restrict damage (should it occur) to areas outside those needed for normal operation.

Figure 4:
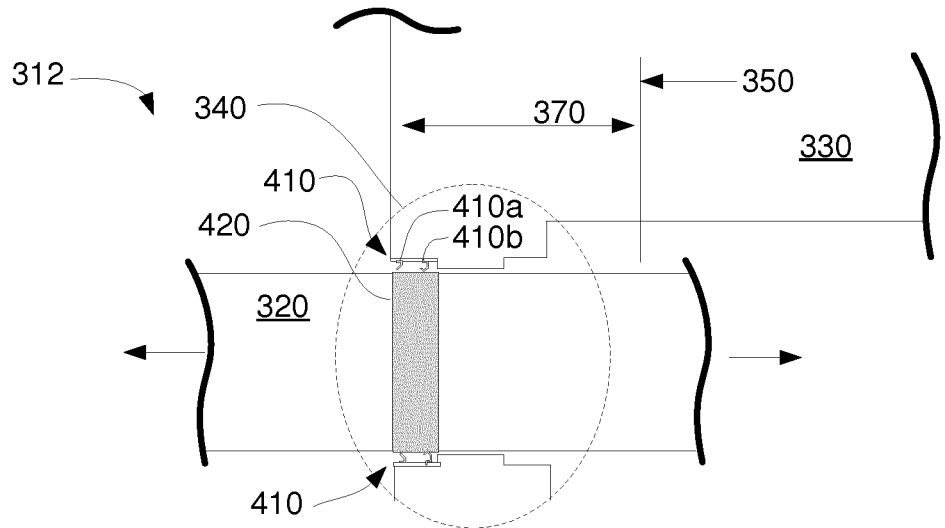
FIG. 4 is a diagrammatic representation of localized damage restricted to a parking position configuration, according to various embodiments.

FIG. 4 is a diagrammatic representation of localized damage restricted to a parking position configuration, according to various embodiments, according to the invention. Cylinder 312 includes a sealing region 340 having a seal 410 (e.g., an annular contact area) between piston 320 and barrel 330. Seal 410 may include an annular wiper 410a (e.g., brass), which may be separated from piston 320 by a gap of 0.5-1 mm. Seal 410 may include a gasket 410b (e.g., rubber or plastic) which may contact piston 320. Seal 410 may include multiple gaskets 410b and/or multiple wipers 410. A single sealing region 410 is shown for simplicity. In some cases, the wiper is exterior with respect to the seal. In some cases, the wiper is interior with respect to the seal. A cylinder may have several sealing regions 340, each having its own seal 410. Cylinder 312 includes a working length 350 (of which one end is shown) and piston 320 is retracted an additional distance 370 into barrel 330, positioning cylinder 312 in a position outside working length 350.

Degradation products 420 (shown schematically) may form at a contact area between seal 410 and piston 320. Degradation products 420 may have a shape associated with this contact area (e.g., degradation products 420 may be an annular ring shape around a circumference of piston 320).

During use, sliding of degradation products 420 beneath seal 410 (e.g., as piston 320 moves) could damage seal 410 or otherwise impair performance. To minimize damage induced by degradation products 420 during normal operation, cylinder 312 may be "parked" by retracting piston 320 additional distance 370 into barrel 330, beyond the working length 350 needed for operation (as shown in FIG. 4). While parked, degradation products 420, if they do form, may not form within the working length 350 of piston 320. As such, the degradation products need not frequently pass beneath seal 410 during operation (when cylinder 312 operates within its working length 350).

Figure 5:
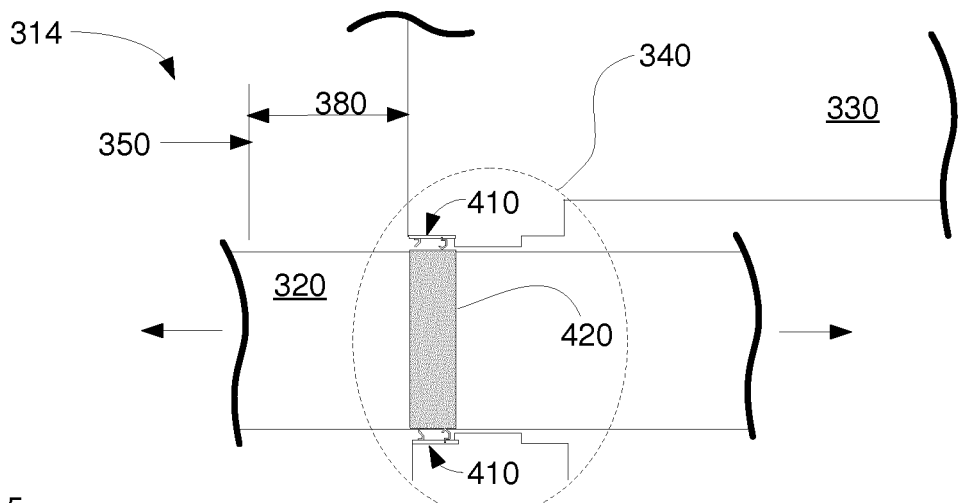
FIG. 5 is a diagrammatic representation of localized damage restricted to a parking position configuration, according to various embodiments.

FIG. 5 is a diagrammatic representation of localized damage restricted to a parking position configuration, according to various embodiments. Cylinder 314 includes a sealing region 340 having a seal 410 between piston 320 and barrel 330, and includes a working length 350 (of which one boundary is shown) needed to provide for a desired range of motion. To minimize damage (e.g., wear of seal 410 by degradation products 420), cylinder 314 includes an additional distance 380 beyond the working length 350 needed for operation. During periods of inactivity, cylinder 314 may be "parked" in the configuration shown in FIG. 5, by extending piston 320 out from barrel 330 an additional distance 380, such that degradation products 420 do not form within the working length 350 of piston 320 used during operation.

Figure 6:
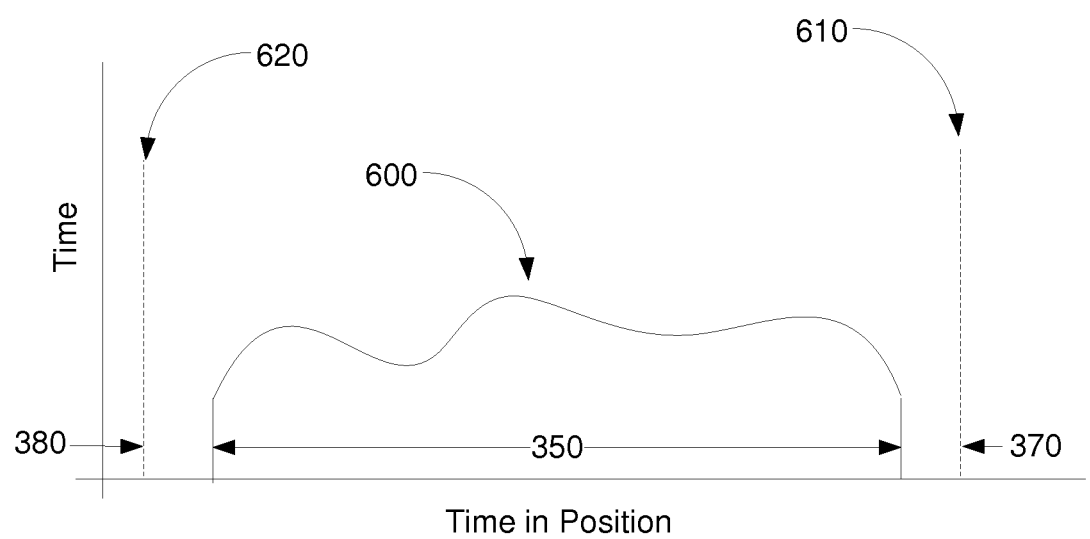
FIG. 6 is a diagrammatic representation time spent in a position as a function of position, according to some embodiments.

FIG. 6 is a diagrammatic representation of time spent in a configuration (e.g., of a cylinder, a linkage, and the like) as a function of position, according to some embodiments. An apparatus incorporating a cylinder having an additional distance (e.g., cylinders 310, 312, 314 FIGS. 3-5) may be characterized by an expected first response 600 that describes an amount of time spent (or expected to be spent) at various positions within a working range (e.g., the range of motion used during operation). This response may be represented by the time spent within and outside working length 350. Time spent "parked" in an extended position (and/or additional distance, in the case of a cylinder) is represented (in this example) by second response 610 (and/or third response 620). Second response 610 may show time spent by a cylinder 310 at additional distance 380 outside working length 350, which may represent time spent by a linkage (actuated by the cylinder) in an extended position outside the working range of the apparatus. Third response 620 may represent time spent by a cylinder 310 at an additional distance 370 outside working length 350, which may represent time spent by a linkage (actuated by the cylinder) in an extended position outside the working range of the apparatus.

An apparatus that combines a linkage having an extended position and an associated cylinder having an additional distance may be "parked" in this extended position/additional distance configuration. In such cases, the apparatus spends stationary (parked) time in a configuration outside the working range 350 (as represented by responses 610 and 620). The time spent parked, while it may result in damage, may not damage contact areas of the apparatus and/or cylinder that are used during normal operation.

Figure 7A:
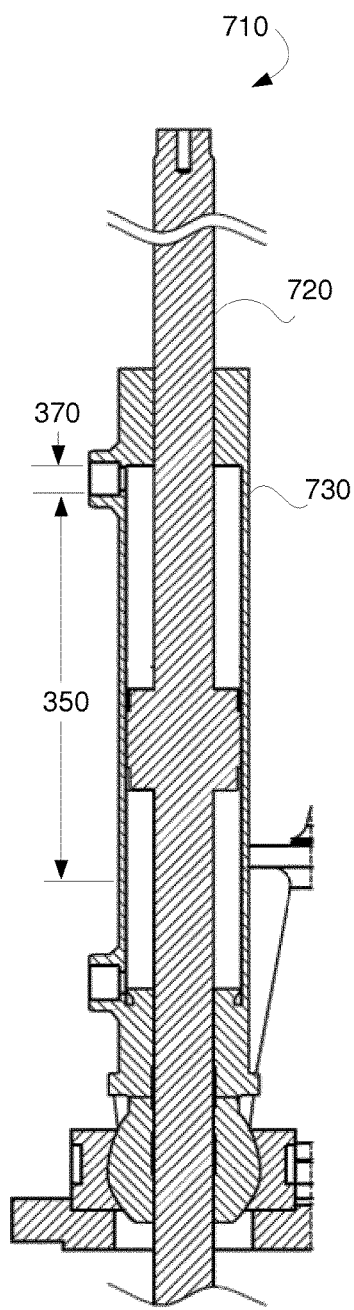
FIGS. 7A-C illustrate a cylinder (e.g., a nozzle control cylinder) in various configurations, according to some embodiments.
Figure 7B:
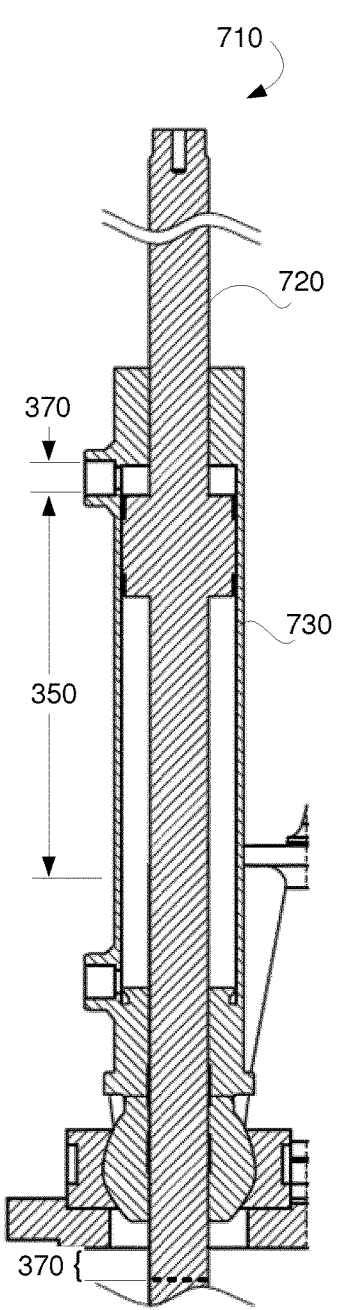
Figure 7C:
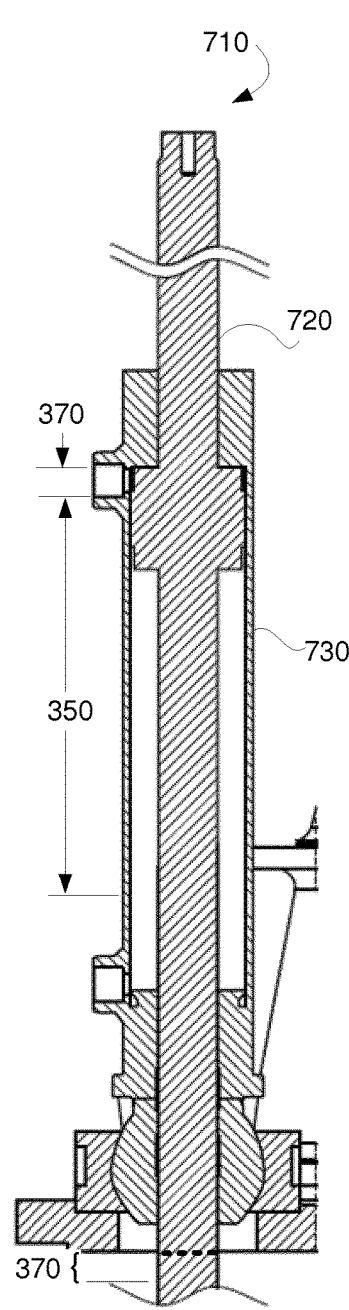

FIGS. 7A-C illustrate a cylinder (e.g., a nozzle control cylinder) in various configurations, according to some embodiments. Cylinder 710 includes a piston 720 that slides within a barrel 730 (e.g., to actuate a linkage (not shown)). Piston 720 may be positioned at various points within barrel 730 to configure cylinder 710 at a position within its working length or at an additional distance outside its working length, and thus actuate a coupled linkage to a position within its working range or an extended position outside its working range (respectively). Cylinder 710 includes a working length 350 and an additional distance 370.

In FIG. 7A, cylinder 710 is configured in a position near the midpoint of its working length 350 (e.g., to position an apparatus near the midpoint of its working range). In FIG. 7B, cylinder 710 is configured in a position at an end of its working length 350 (e.g., to position an apparatus at an end of its working range). In FIG. 7C, piston 720 has been moved an additional distance 370, configuring cylinder 710 in a parking position outside its working length 350 (e.g., to position an apparatus in an extended position outside its working range). In this example, cylinder 710 is parked by "retracting" piston 720 an additional distance 370 into barrel 730 (which has a corresponding additional depth needed for such additional retraction beyond the working distance).

Figure 8A:
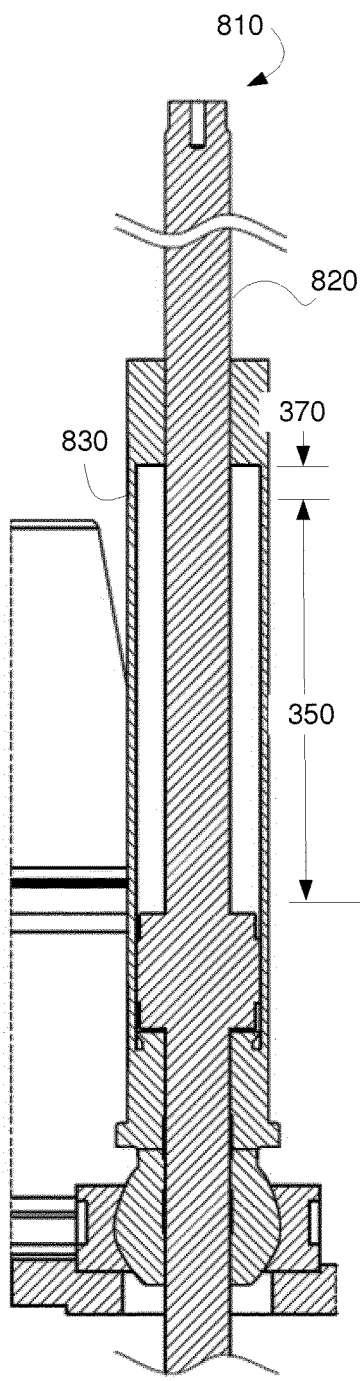
FIGS. 8A-C illustrate a cylinder (e.g., a scoop control cylinder) in various configurations, according to some embodiments.
Figure 8B:
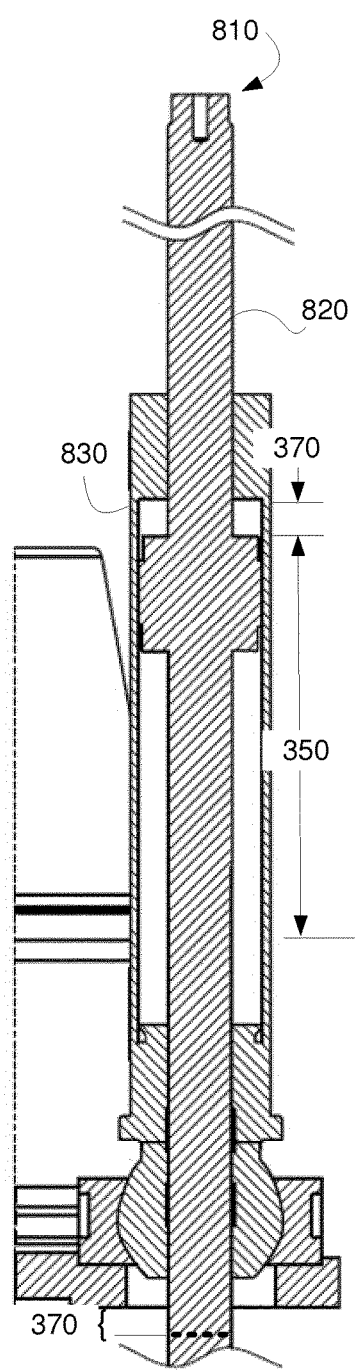
Figure 8C:
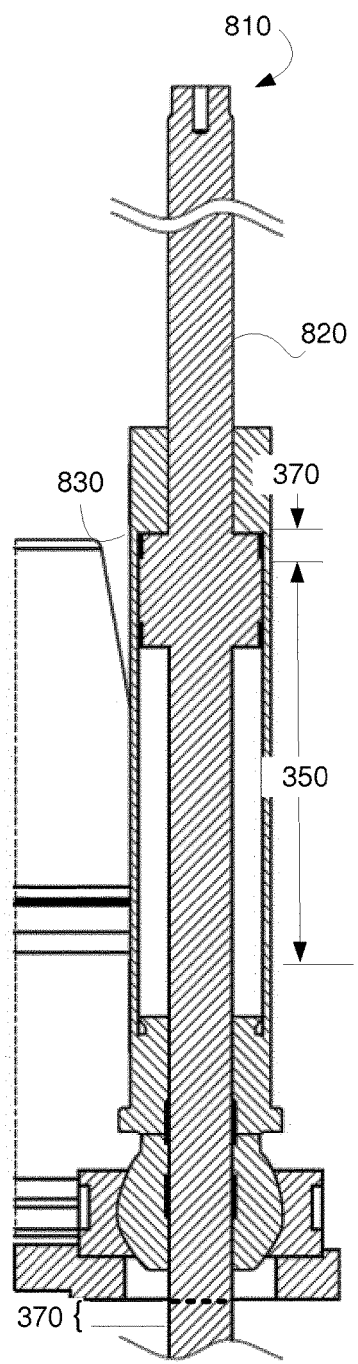

FIGS. 8A-C illustrate a cylinder (e.g., a scoop control cylinder) in various configurations, according to some embodiments. Cylinder 810 includes a piston 820 that slides within a barrel 830 (e.g., to actuate a linkage (not shown)). Piston 820 may be positioned at various points within barrel 830 to configure cylinder 810 at a position within its working length or a position within its additional distance, and for a coupled linkage, actuate the linkage to a position within its working range or an extended position outside its working range (respectively).

In FIG. 8A, cylinder 810 is configured in a position at one end of its working length 350 (in this case, with piston 820 fully extended). In FIG. 8B, cylinder 810 is configured in a position at the other end of its working length 350. In FIG. 8C, piston 820 has been moved an additional distance 370, configuring cylinder 810 in a parking position outside its working length 350. In this example, cylinder 810 is parked by "retracting" piston 820 an additional distance 370 into barrel 830 (which has a corresponding additional depth needed for such additional retraction beyond the working distance).

A linkage may couple a cylinder to an apparatus actuated by the cylinder, such that linear motion and/or force from the cylinder is translated into a desired motion (e.g., linear, angular, rotational, and the like) of, and/or force on, an apparatus being actuated. Exemplary apparatus include a rudder, a nozzle, a scoop, a propeller, a pod, a water jet, and the like. Exemplary apparatus include a shovel, a backhoe, an arm, a boom or other loading equipment, an antenna, and/or any other hydraulically actuated equipment. An aircraft may include apparatus according to some embodiments.

A ship propulsion system may include a propulsion apparatus and a steering apparatus. A propulsion apparatus may include a water jet (configured to create a jet of water), a propeller, a pod-based propeller, or other system that propels the ship forward or backward. A steering apparatus may include a rudder, a nozzle, a vane, a propeller, a water jet, and/or other system that imparts lateral thrust on a ship. A propulsion system may include a propeller (e.g., for propulsion) and a rudder (e.g., for steering). A propulsion system may include a steerable pod (e.g., a propeller having a controllable thrust direction, configurable to provide both forward/backward and lateral thrusts).

Some embodiments include a water jet to provide for forward propulsion, a scoop to provide for reverse propulsion, and an adjustable nozzle for steering. The scoop may be adjustably disposed in the water jet to controllably redirect at least a portion of the water jet in a forward direction, which may impart a controllable reverse thrust on the ship.

A propulsion and a steering apparatus may operate on the same water jet. A propulsion apparatus may include a first "propulsion" water jet and a steering apparatus may include a second "steering" water jet. Various embodiments include a propulsion apparatus or a steering apparatus. Some embodiments include both a propulsion apparatus and a steering apparatus.

FIGS. 9A-F illustrate an exemplary embodiment. Propulsion system 900 may include a water jet 910 to generate a jet of water (e.g., to propel a ship forward). A scoop 920 may be controllably disposed in the jet to redirect at least a portion of the jet in a forward direction, imparting a reverse thrust on the ship. The jet flows through nozzle 940, which may be adjusted to redirect the jet in a lateral direction, steering the ship. Scoop 920 and nozzle 940 may be actuated simultaneously (e.g., to steer while moving in reverse, or generate a lateral thrust while generating zero net forward thrust).

Figure 9A:
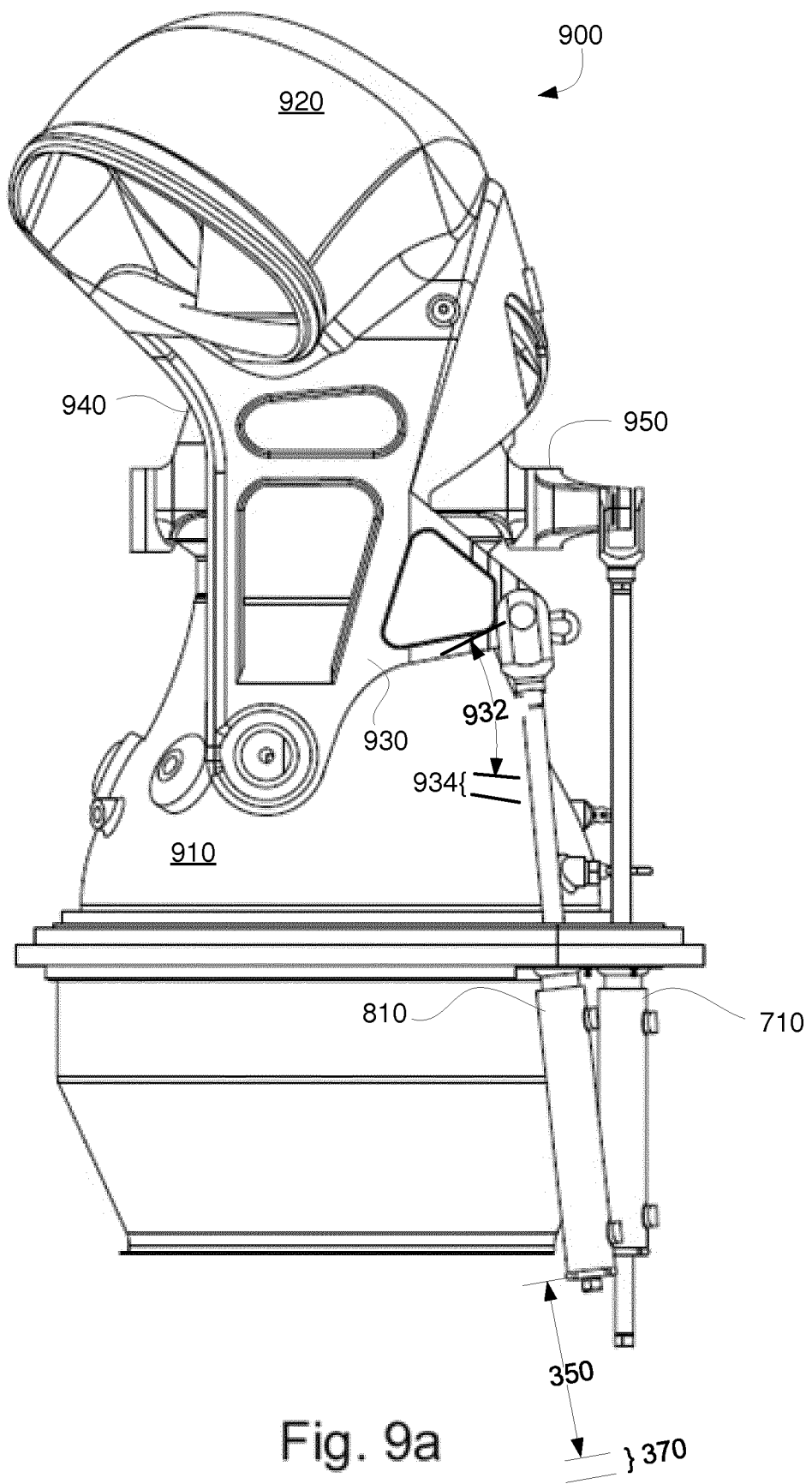
FIGS. 9A-F illustrate an exemplary embodiment.
Figure 9B:
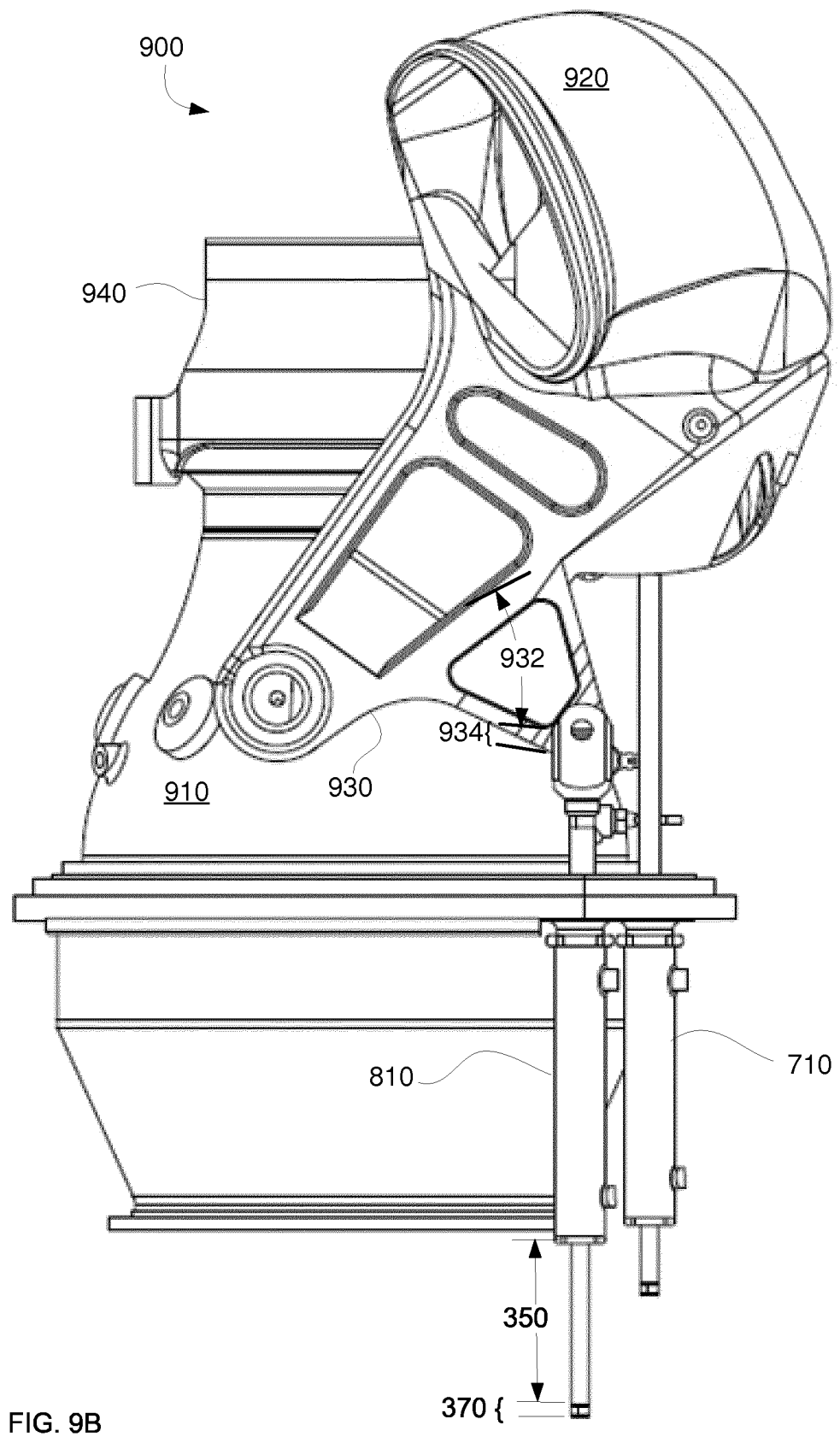
Figure 9C:
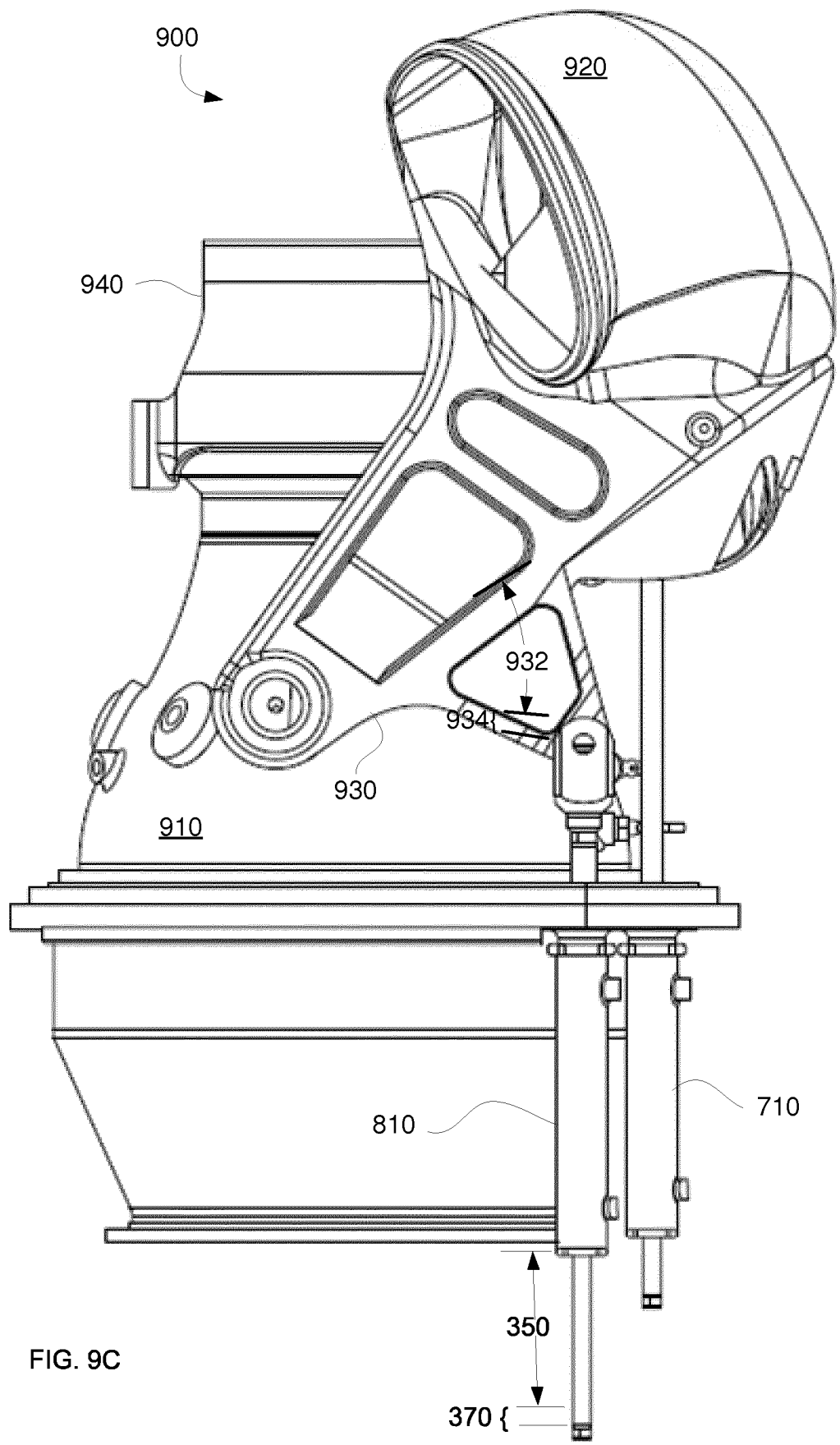
Figure 9D:
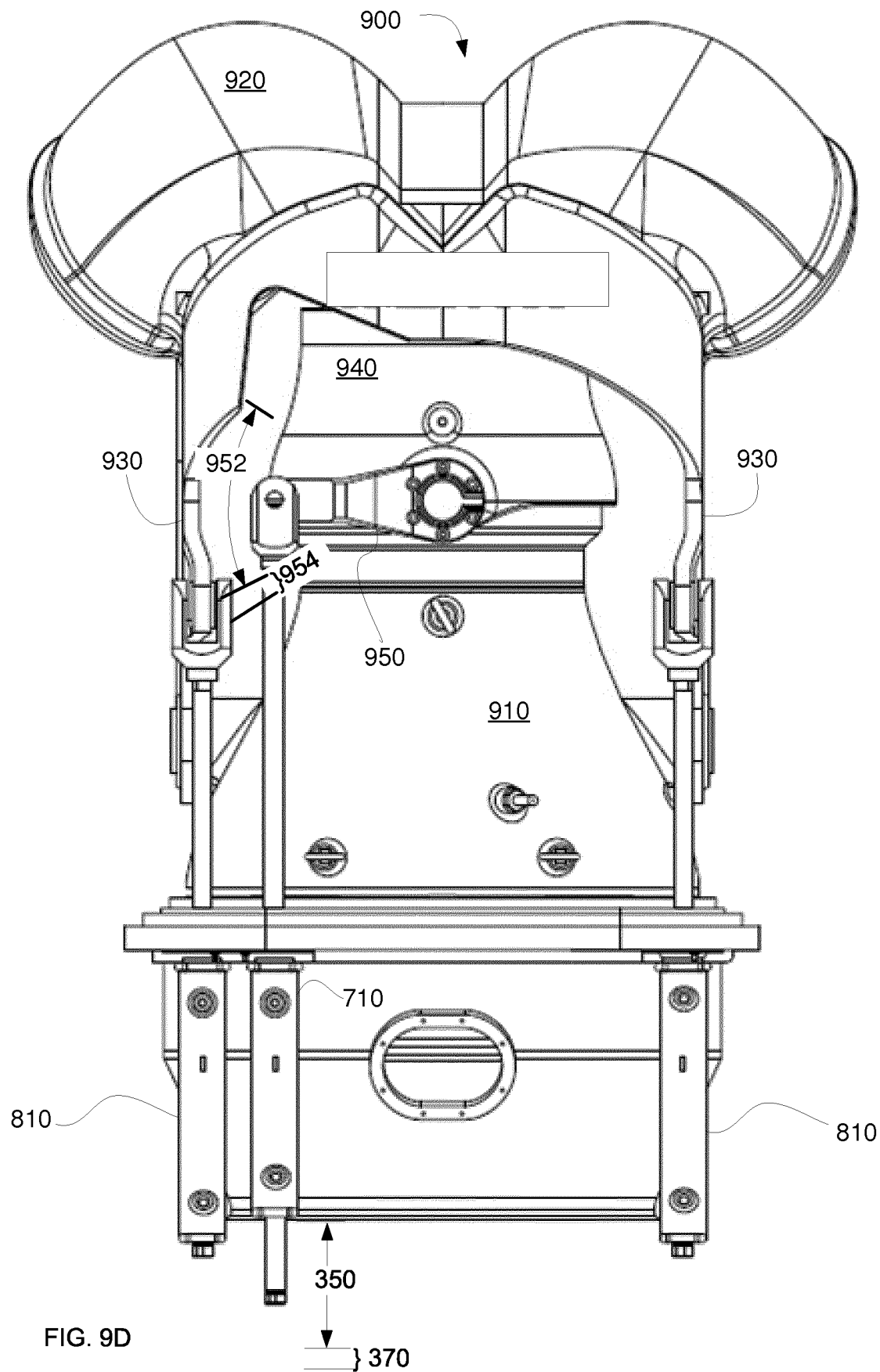
Figure 9E:
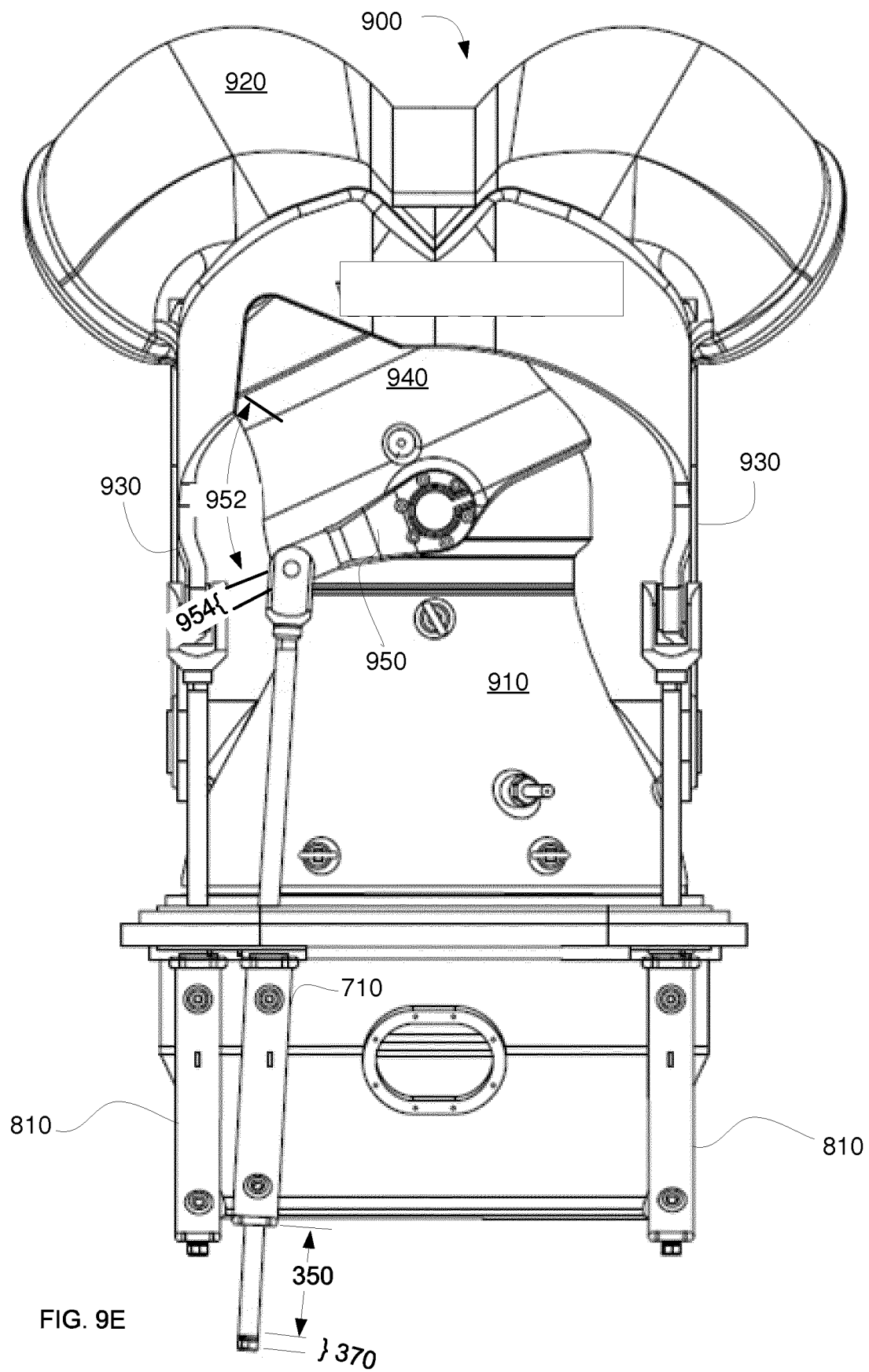
Figure 9F:
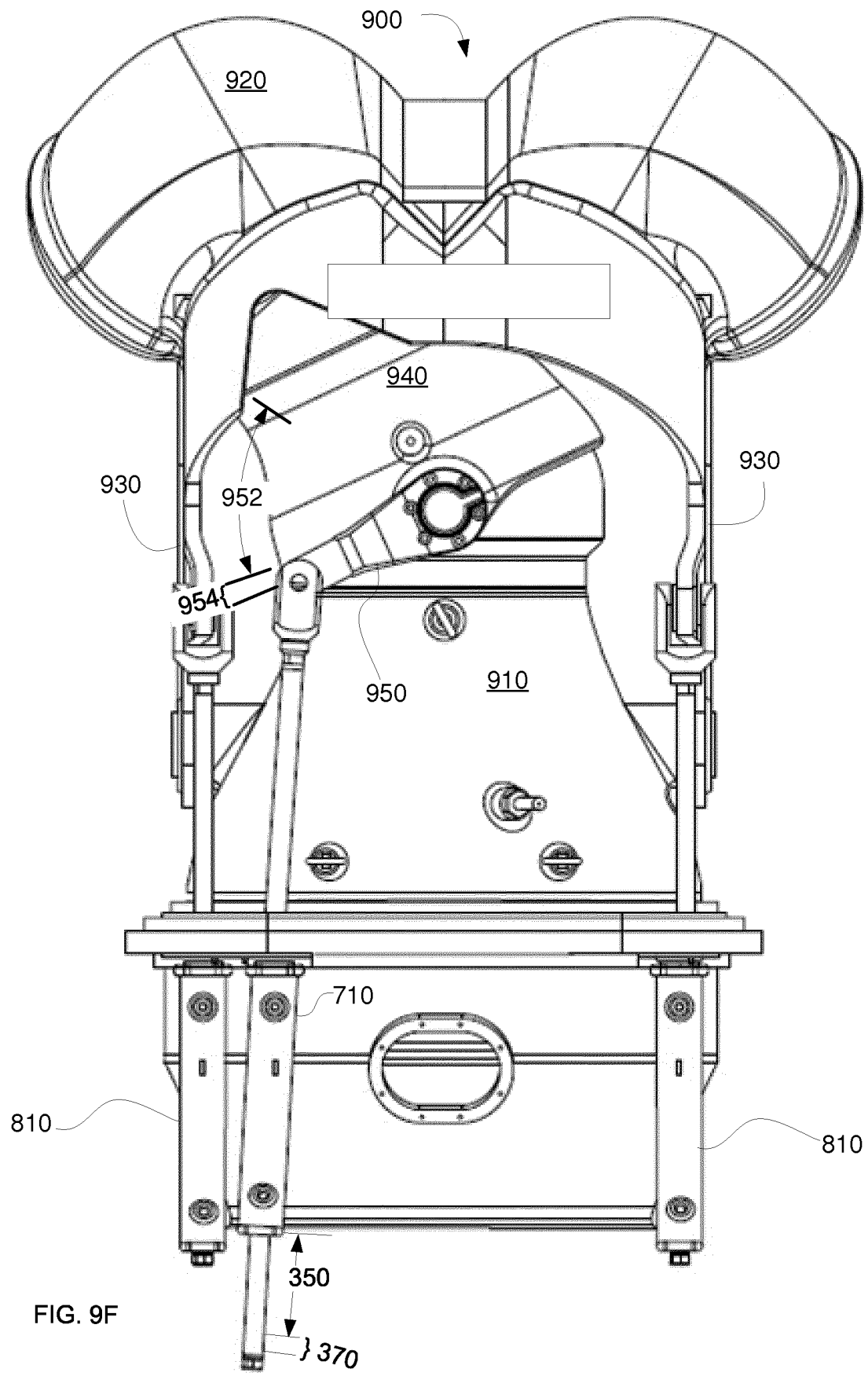

Scoop 920 is coupled to a ship via a scoop linkage 930, which is actuated by a scoop control cylinder 810. Scoop linkage 930 includes a working range 932, within which the scoop may be positioned during operation. Scoop linkage 930 includes an extended position 934, outside working range 932, in which the apparatus may be parked. Scoop control cylinder 810 includes a working length 350 (corresponding to working range 932) within which the apparatus may be operated. Scoop control cylinder 810 also includes an additional distance 370, outside working length 350, which positions scoop linkage 930 in an extended position 934, in which the apparatus (e.g., scoop 920) may be parked. FIGS. 9A-F illustrate various configurations of propulsion system 900. FIGS. 9A-C illustrate side views; FIGS. 9D-F illustrate plan views.

FIG. 9A illustrates propulsion system 900 in a "full reverse/straight" configuration. Scoop 920 is positioned within (what would be) the jet of water to provide a maximum reverse thrust. Scoop control cylinder 810 is positioned at one end of its working length 350 (e.g., see FIG. 8A) and scoop linkage 930 is positioned at one end of its working range 932. Nozzle 940 is positioned at a midpoint of its working range via a nozzle linkage 950 and nozzle control cylinder 710 (e.g., see FIG. 7A).

FIG. 9B illustrates propulsion system 900 in a "full ahead/straight" configuration. Scoop 920 is positioned substantially outside, or beyond the flow of, (what would be) the jet of water, resulting in maximum forward thrust. Scoop control cylinder 810 is positioned at the other end of its working length 350 (e.g., see FIG. 8B) and scoop linkage 930 is positioned at the other end of its working range 932.

FIG. 9C illustrates propulsion system 900 with scoop 920 in a parked configuration. Scoop 920 is positioned (in this configuration) even further away from the jet of water than for the configuration shown in FIG. 9B. Scoop control cylinder 810 is positioned at an additional distance 370 (e.g., see FIG. 8C, in this example at the end of the available additional distance). Scoop linkage 930, and by extension, scoop 920, are positioned at an extended scoop position 934 outside working range 932.

FIG. 9D illustrates propulsion system 900 in a "full reverse/straight" configuration. Scoop 920 is positioned within (what would be) the jet of water to provide a maximum reverse thrust. Scoop control cylinders 810 are positioned at one end of their working lengths 350 (e.g., see FIG. 8A) and scoop linkages 930 are positioned at one end of their working ranges 932 (FIG. 9A). Nozzle control cylinder 710 is positioned in its working length 350 (e.g., see FIG. 7A), positioning nozzle linkage 950 at a midpoint of its working range 952, positioning nozzle 940 at a midpoint of its range of motion.

FIG. 9E illustrates propulsion system 900 in a "full reverse/full starboard" configuration. Scoop 920 is positioned within (what would be) the jet of water to provide a maximum reverse thrust. Scoop control cylinders 810 are positioned at one end of their working lengths 350 (e.g., see FIG. 8A) and scoop linkages 930 are positioned at one end of their working ranges 932 (FIG. 9A). Nozzle linkage 950 (and by extension, nozzle 940) is positioned at the starboard end of its working range 952, and nozzle control cylinder 710 is positioned at an end of its working length 350 (e.g., see FIG. 7B).

FIG. 9F illustrates propulsion system 900 with nozzle 940 in a parked configuration. Nozzle linkage 950 (and by extension, nozzle 940) is positioned in an extended nozzle position 954, and nozzle control cylinder 710 is positioned at an additional distance 370 (e.g., see FIG. 7C, in this example at the end of the additional distance 370).

Figure 10A:
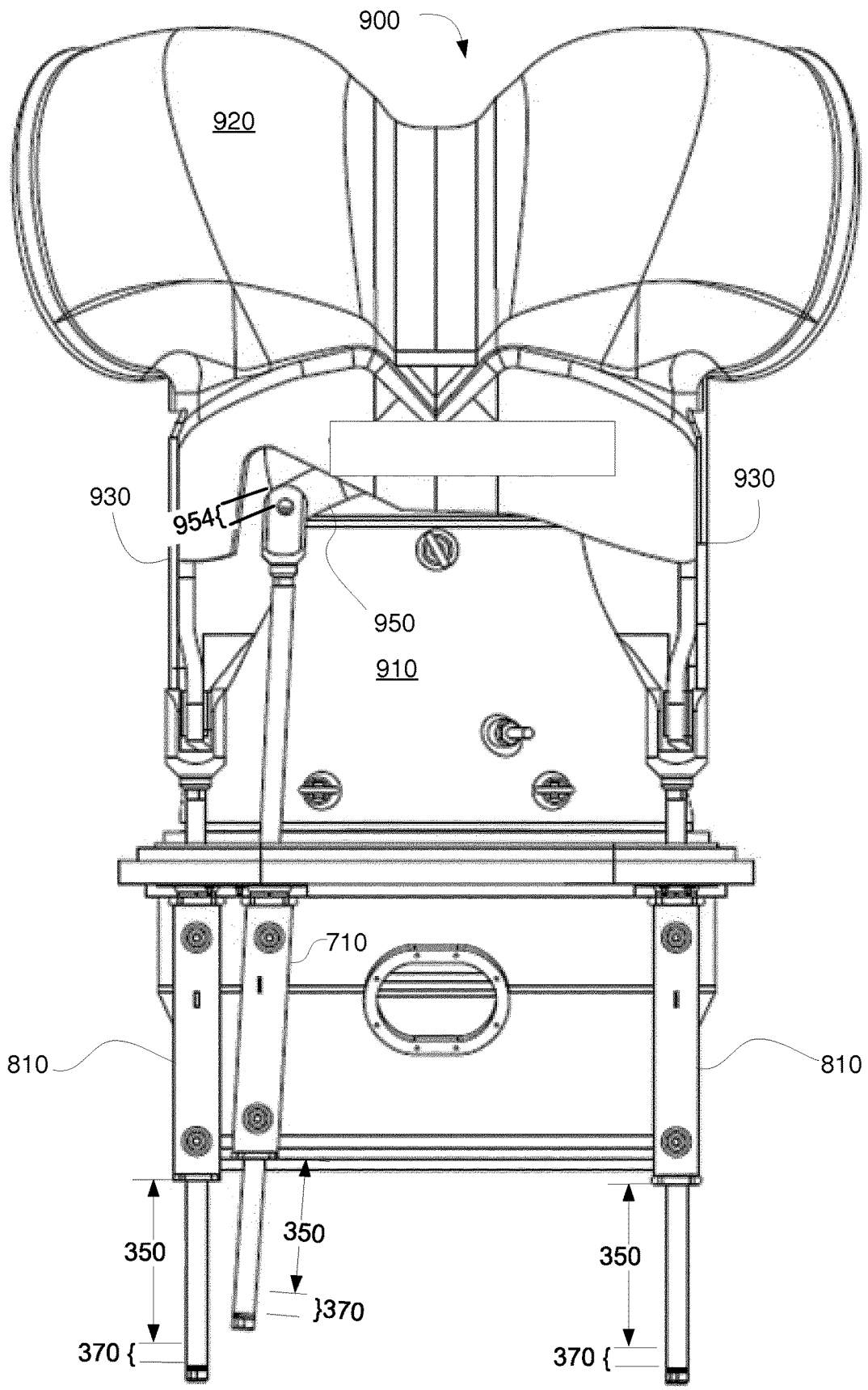
FIGS. 10A-B illustrate plan and side views (respectively) of a propulsion system in a parked configuration, according to some embodiments.
Figure 10B:
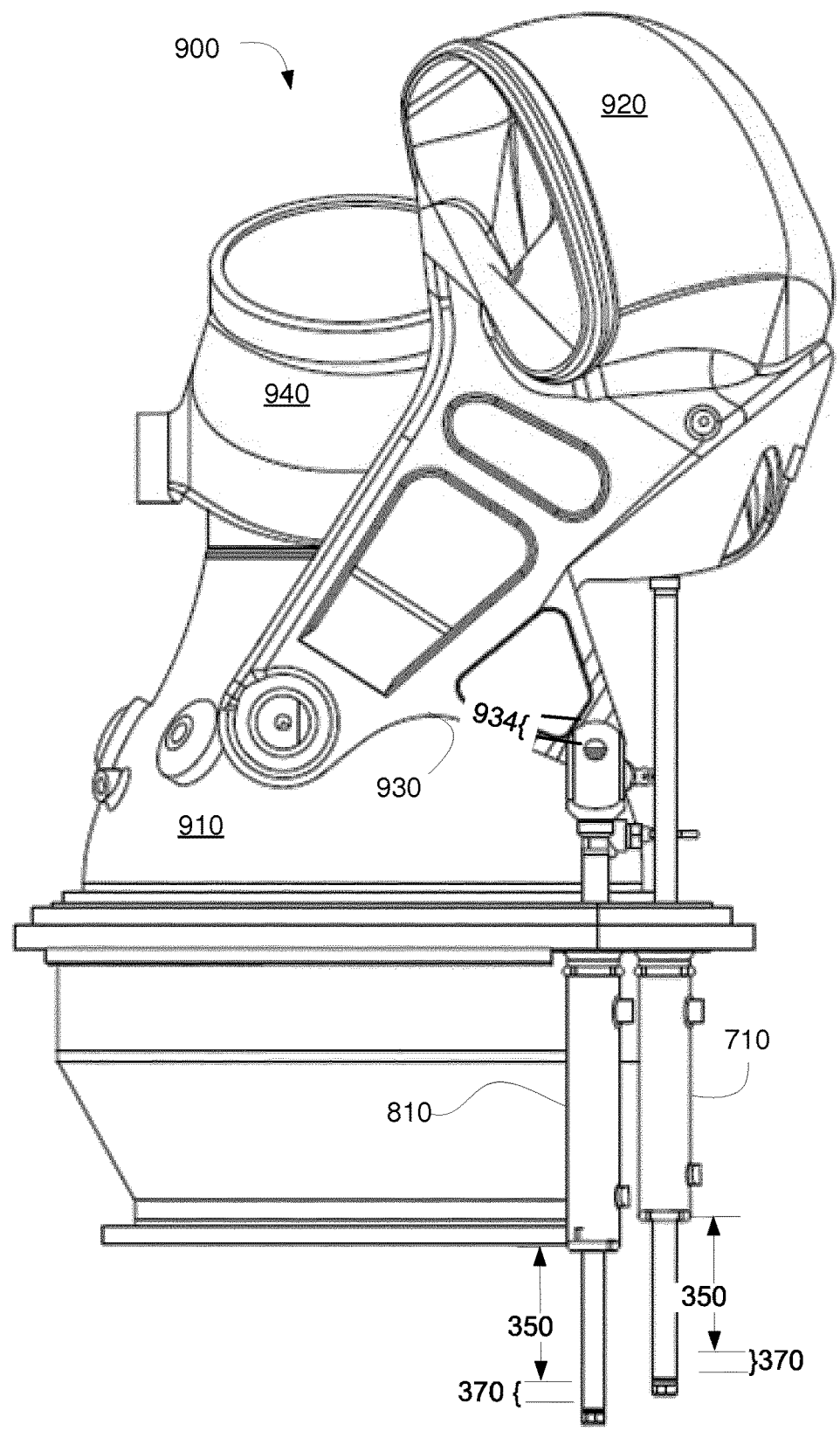

FIGS. 10A-B illustrate plan and side views (respectively) of propulsion system in a parked configuration. Propulsion system 900 is configured such that scoop control cylinders 810 are positioned an additional distance 370 (e.g., see 8C) outside its working length 350, and nozzle control cylinder 710 is positioned an additional distance 370 (e.g., see 7C) outside its working length 350. Scoop linkage 930 is in an extended scoop position 934 (FIG. 9C) positioning scoop 900 in a parking position, and nozzle linkage 950 is in an extended nozzle position 954 (FIG. 9F) positioning nozzle 940 in a parking position.

Some embodiments may include a cylinder having a piston and a barrel within which the piston slides. A seal between the barrel and piston may be associated with a mark (e.g., degradation) whose position on the piston may identify position at which the piston remains during inactivity. A working length of the piston within the cylinder may be identified. A mark (e.g., degradation product 420) located at an end of, or even outside of, the working length may be indicative of various embodiments disclosed herein. For example, a working length may be associated with the middle 98% of a piston, and the 1% on either end may be associated with an extended position.

Figure 11:
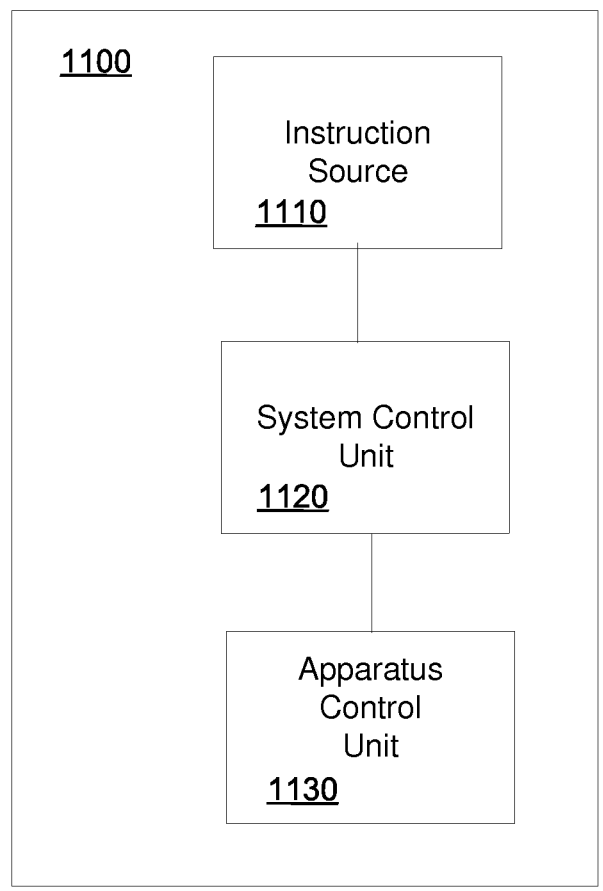
FIG. 11 illustrates a system, according to some embodiments.

FIG. 11 illustrates a system, according to some embodiments. System 1100 may include an instruction source 1110, a system control unit 1120, and an apparatus control unit 1130. Instruction source 1110 may indicate or convey a desired configuration of an apparatus (e.g., a desired combination of thrust and direction). In some cases instruction source 1110 may comprise a navigation system (e.g., under control of a cockpit of a vessel). Instruction source 1110 may send desired apparatus positions to system control unit 1120. Various systems and components may include a computer readable storage media coupled to a processor and memory. The processor may receive input from and/or provide instructions to park an apparatus (e.g., operate a cylinder to actuate a linkage to position an apparatus in a parking position). The storage media may include instructions executable by the processor to perform a method comprising the receipt of an indication to park an apparatus and the issuance of instructions to park the apparatus.

System control unit 1120 may communicate with instruction source 1110, and may determine whether a desired instruction corresponds to an operational instruction or a parking instruction. For a parking instruction, system control unit 1120 may instruct apparatus control unit 1130 to configure an apparatus in a parking position. For an operational instruction, system control unit 1120 may instruct apparatus control unit 1130 to configure an apparatus within its working range for operation.

Apparatus control unit 1130 may receive instructions from system control unit 1120 and actuate a parkable apparatus. A parkable apparatus may include a control cylinder having a working length and an additional distance outside the working length. The apparatus may include a linkage, coupled to the control cylinder, having a working range and an extended position outside the working range. Upon receiving an instruction to park, apparatus control unit 1130 may position the control cylinder(s) at one or more additional distances outside the working length. The control cylinder(s) may then position the linkage(s) at one or more extended positions outside the working range.

During normal operation (within the range of motion), an instruction other than an instruction to park may cause apparatus 1130 to position the apparatus in a desired position for operation. A control cylinder may be positioned within its working length, positioning a linkage within its working range. Some embodiments include a lockout that prevents positioning of an apparatus in a parking position without a parking instruction. A lockout may constrain a cylinder to its working length. A lockout may constrain a linkage to its working range. Some implementations may include an automated "parking" process, in which a process (e.g., initiated by a user) places one or more components in a parking position.

Figure 12:
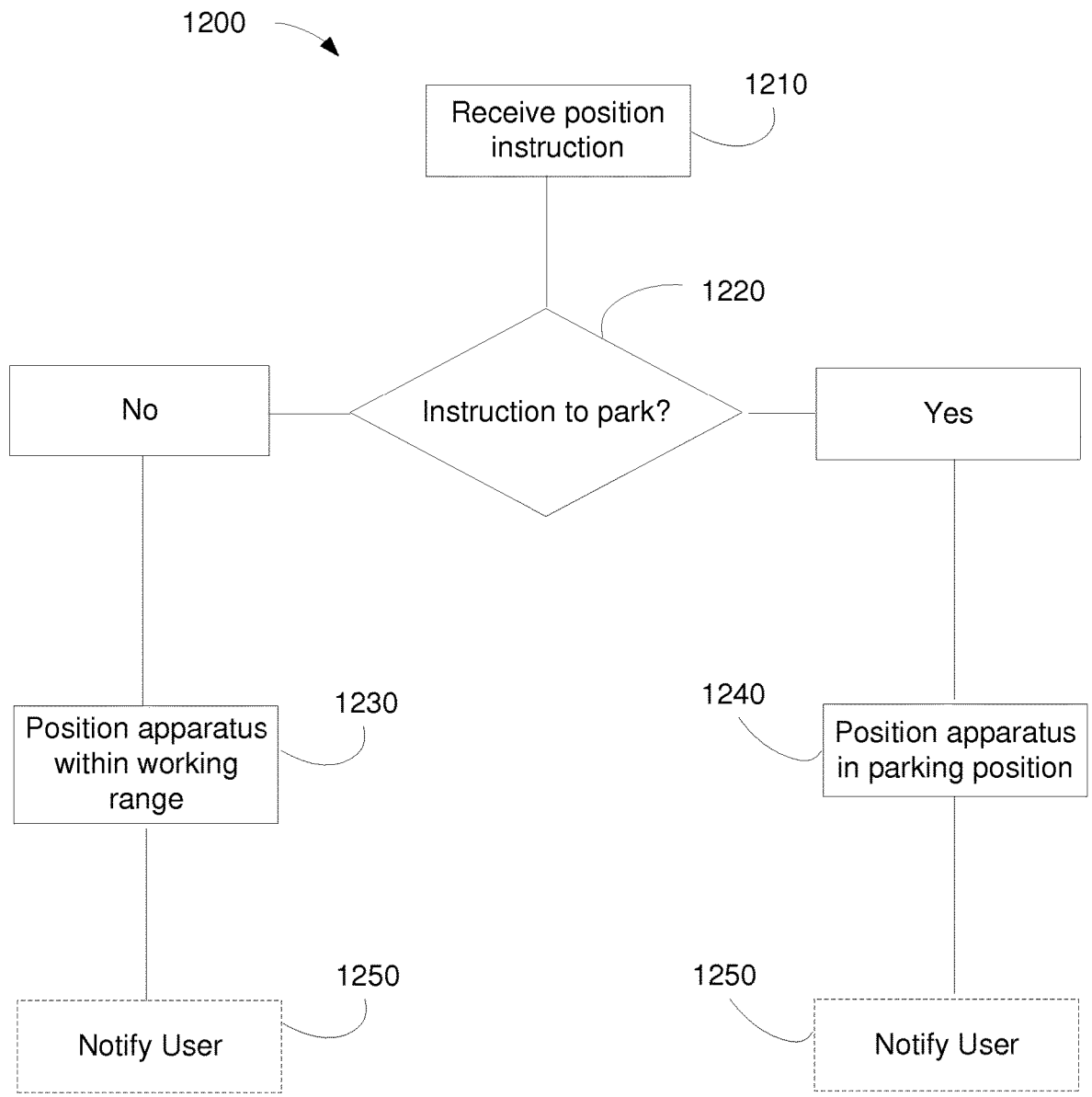
FIG. 12 illustrates a method, according to some embodiments.

FIG. 12 illustrates a method, according to some embodiments. Method 1200 may describe a logical algorithm used (e.g., by system 1100) to actuate an apparatus. In step 1210, an instruction to position an apparatus is received. In step 1220, the system determines whether the instruction includes an instruction to park the apparatus. If the instruction does not include an instruction to park, step 1230 may position the apparatus at a position within its working range. If the instruction includes an instruction to park, step 1240 may position the apparatus in a parking position. In optional step 1250, a user is notified of the position. In some cases, a user may be notified that a desired position (e.g., outside the working range) was not achieved because a parking instruction was not sent (e.g., a user may be informed that the apparatus is at an end of its working range).

Systems and methods described herein may be incorporated into a wide variety of apparatus. An apparatus having a component (e.g., a seal, a contact area, and the like) whose performance is degraded by extended periods of inactivity may benefit from modification according to systems and methods described herein (e.g., designing the system to have an extended position outside its working range and parking the system in the extended position).

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A water jet propulsion system for a boat, ship, submarine, or subsurface device, the propulsion system comprising:
    a water jet configured to generate a jet of water to propel the boat, ship, submarine, or subsurface device;
    a scoop shaped to controllably redirect at least a portion of the jet during normal operation of the water jet propulsion system in which the water jet generates the jet of water;
    a scoop parking apparatus comprising:
        a scoop linkage comprising at least one of a pivot and a lever arm, the scoop linkage configured to couple the scoop to the boat, ship, submarine, or subsurface device, the scoop linkage having a scoop range of motion comprising:
            a forward/reverse working range, within which the scoop may be positioned in the jet to yield a forward/reverse thrust during the normal operation of the water jet propulsion system, wherein the forward/reverse thrust is selected from the group consisting of a forward thrust, a reverse thrust, and a combination of forward and reverse thrusts, wherein a forward end of the forward/reverse working range disposes the scoop substantially outside the jet of water resulting in maximum forward thrust and a reverse end of the forward/reverse working range disposes the scoop within the jet of water resulting in maximum reverse thrust, and
            an extended scoop position, in which the scoop is disposed further away from the jet of water than when the scoop is disposed at the forward end of the forward/reverse working range, at which the scoop may be parked during a period of inactivity;
        a scoop control actuator coupled to the scoop linkage, the scoop control actuator comprising:
            a scoop working length operable to actuate the scoop linkage to position the scoop within the forward/reverse working range; and
            a scoop additional distance operable to actuate the scoop linkage to position the scoop at the extended scoop position outside the forward/reverse working range during the period of inactivity; and
    a system controller comprising a processor coupled to computer readable non-transitory storage media configured to receive an instruction to park the scoop parking apparatus, identify the extended scoop position for the scoop parking apparatus that disposes the scoop further away from the jet of water than when the scoop is disposed at the forward end of the forward/reverse working range, and direct the scoop control actuator to move to the scoop additional distance.

2. The water jet propulsion system of claim 1, wherein the scoop control actuator comprises an electrically driven actuator.

3. The water jet propulsion system of claim 2,
    wherein: the electrically driven actuator comprises a lead screw; and
    the additional distance comprises an additional distance into the actuator into which the lead screw retracts to position the scoop at the extended scoop position.

4. The water jet propulsion system of claim 1, wherein the scoop control actuator comprises a hydraulic cylinder.

5. The water jet propulsion system of claim 4, wherein the additional distance comprises an additional distance into a barrel of the hydraulic cylinder into which a piston of the hydraulic cylinder retracts to position the scoop at the extended scoop position.

6. The water jet propulsion system of claim 5, wherein the scoop control actuator comprises two hydraulic cylinders, each having a corresponding piston and barrel, each hydraulic cylinder having an additional distance into which the corresponding piston retracts to position the scoop at the extended scoop position.

7. A water jet propulsion system for a boat, ship, submarine, or subsurface device, the propulsion system comprising:
    a water jet configured to generate a jet of water to propel the boat, ship, submarine, or subsurface device;
    a nozzle through which the jet is configured to flow during normal operation of the water jet propulsion system in which the water jet generates the jet of water; and
    a nozzle parking apparatus comprising:
        a nozzle linkage comprising at least one of a pivot and a lever arm, the nozzle linkage configured to couple the nozzle to the boat, ship, submarine, or subsurface device, the nozzle linkage having a lateral range of motion comprising:
            a lateral working range, within which the nozzle may be positioned in the jet to yield a desired lateral thrust during the normal operation of the water jet propulsion system, wherein at a full starboard end of the lateral working range the lateral thrust would steer the boat, ship, submarine, or subsurface device in its most starboard heading, and at a full port end of the lateral working range the lateral thrust would steer the boat, ship, submarine, or subsurface device in its most port heading, and
            an extended nozzle position, in which the nozzle is outside the lateral working range, at which the nozzle may be parked during a period of inactivity;
        a nozzle control actuator coupled to the nozzle linkage, the nozzle control actuator comprising:
            a nozzle working length operable to actuate the nozzle linkage to position the nozzle within the lateral working range; and
            a nozzle additional distance operable actuate the nozzle linkage to position the nozzle at the extended nozzle position outside the lateral working range during the period of inactivity; and
    a system controller comprising a processor coupled to computer readable non-transitory storage media configured to receive an instruction to park the nozzle parking apparatus, identify the extended nozzle position for the nozzle parking apparatus that positions the nozzle beyond at least one of the full starboard end and the full port end of the lateral working range, and direct the nozzle control actuator to move to the nozzle additional distance.

8. The water jet propulsion system of claim 7, wherein the nozzle control actuator comprises an electrically driven actuator.

9. The water jet propulsion system of claim 8, wherein the nozzle control actuator comprises one electrically driven actuator.

10. The water jet propulsion system of claim 8,
wherein: the electrically driven actuator comprises a lead screw;
and
the additional distance comprises an additional distance into the actuator into which the lead screw retracts to position the nozzle at the extended nozzle position.

11. The water jet propulsion system of claim 7, wherein the nozzle control actuator comprises a hydraulic cylinder.

12. The water jet propulsion system of claim 11, wherein the additional distance comprises an additional distance into a barrel of the hydraulic cylinder into which a piston of the hydraulic cylinder retracts to position the nozzle at the extended nozzle position.

13. The water jet propulsion system of claim 12, wherein the nozzle control actuator comprises one hydraulic cylinder.

* * * * *